United States Patent
Tamma et al.

(10) Patent No.: US 8,006,653 B2
(45) Date of Patent: Aug. 30, 2011

(54) COMBUSTION METHOD, SYSTEM, AND ARTICLE

(75) Inventors: Bhaskar Tamma, Bangalore (IN); Ke Liu, Rancho Santa Margarita, CA (US)

(73) Assignee: General Electric Company, Niskayuna, NY (US)

( * ) Notice: Subject to any disclaimer, the term of this patent is extended or adjusted under 35 U.S.C. 154(b) by 483 days.

(21) Appl. No.: 12/177,535

(22) Filed: Jul. 22, 2008

(65) Prior Publication Data

US 2010/0018478 A1 Jan. 28, 2010

(51) Int. Cl.
*F02B 43/08* (2006.01)
*F02B 13/00* (2006.01)
*F02B 47/08* (2006.01)

(52) U.S. Cl. .......... 123/3; 123/575; 123/568.11

(58) Field of Classification Search .......... 123/1 R, 123/1 A, 2, 3, 25 R, 25 A–25 F, 299, 300, 123/304, 305, 431, 434, 27 GE, 27 R, 525, 123/527, 575
See application file for complete search history.

(56) References Cited

U.S. PATENT DOCUMENTS

| | | | |
|---|---|---|---|
| 4,003,343 A * | 1/1977 | Lee | 123/3 |
| 5,464,606 A * | 11/1995 | Buswell et al. | 423/655 |
| 5,947,063 A * | 9/1999 | Smith et al. | 123/3 |
| 5,979,398 A * | 11/1999 | Yanagihara | 123/299 |
| 6,508,209 B1 * | 1/2003 | Collier, Jr. | 123/3 |
| 6,606,855 B1 * | 8/2003 | Kong et al. | 60/275 |
| 7,296,555 B2 | 11/2007 | Tamma et al. | |
| 7,536,981 B2 * | 5/2009 | Sadikay | 123/1 A |
| 2003/0163988 A1 * | 9/2003 | Kirwan et al. | 60/289 |
| 2005/0115226 A1 * | 6/2005 | Benz et al. | 60/287 |
| 2006/0070587 A1 * | 4/2006 | Bhalsora et al. | 123/3 |

\* cited by examiner

*Primary Examiner* — Noah Kamen
*Assistant Examiner* — Hung Q Nguyen
(74) *Attorney, Agent, or Firm* — Joseph J. Christian

(57) ABSTRACT

A method includes mixing air and converted fuel from an on-board fuel converter in a fuel mixer to form an air-converted fuel mixture, the air-converted fuel mixture includes a short chain hydrocarbon; mixing the air-converted fuel mixture with a high specific heat diluent to form an air-diluent-converted fuel mixture; mixing the air-diluent-converted fuel mixture with a first amount of fuel to form a homogenous mixture. A system and article are included.

14 Claims, 2 Drawing Sheets

COMBUSTION METHOD, SYSTEM, AND ARTICLE

BACKGROUND

1. Technical Field

This disclosure includes embodiments that may relate to a method of combustion. This disclosure includes embodiments that may relate to a system and article that uses the method.

2. Discussion of Art

An internal combustion engine may transform fuels into work or motive power through a combustion reaction. The reaction may produce byproducts such as particulate matter (PM), carbon monoxide (CO), unburned hydrocarbons (UHC), and nitrogen oxides ($NO_x$) (e.g., nitric oxide (NO) and nitrogen dioxide ($NO_2$)). Suitable fuels include, for example, gasoline and diesel. In combusting diesel, the diesel is injected into the engine cylinder where it is vaporized, mixed with air to form an air-fuel mixture, which is then combusted. To obtain maximum combustion of the fuel with the oxygen in the air, it is desirable to provide a uniform air-fuel mixture in the cylinder. However, this is not always possible on a local scale within the cylinder. When the air-fuel mixture is not uniformly mixed, especially when there is a higher local ratio of fuel to air, the fuel does not undergo combustion with oxygen and forms particulate matter in the form of soot.

In addition, when the air-fuel mixture is available in the right ratio, the fuel may burn uniformly to form nitrogen oxides. When the fuel combusts in the presence of oxygen and nitrogen, the temperatures may increase to about 2,500 Kelvin to about 3,000 Kelvin. The formation of nitrogen oxides is exponentially temperature dependent. The slope of this rate increases drastically above 2,000 Kelvin. In other words, as the temperature of combustion increases above 2,000 Kelvin, significantly larger amounts of nitrogen oxides are produced. It may be desirable to minimize nitrogen oxides and particulate matter emissions into the environment.

One method of removing nitrogen oxides from an exhaust fluid involves a post combustion selective catalytic reduction (SCR) process in which nitrogen oxides are reduced. For example, an ammonia-SCR process may use ammonia as a reducing agent in the selective catalytic reduction process to produce nitrogen gas and water. Ammonia-SCR, also referred to as $NH_3$-SCR, may be used because of its catalytic reactivity and selectivity. However, practical use of ammonia has been largely limited to power plants and other stationary applications.

The selective catalytic reduction of nitrogen oxides with hydrocarbons (HC-SCR) may compete with the $NH_3$-SCR process. The hydrocarbon reductant reacts with the nitrogen oxides in the exhaust stream to form primarily nitrogen gas and carbon dioxide. The selective catalytic reduction process uses hydrocarbons as the reducing species as opposed to ammonia. Both the approaches require catalysts. However, these catalysts may present a narrow operating temperature range and deactivate relatively quickly in the presence of $SO_2$.

Accordingly, it may be desirable to have a system and method that differs from those systems and methods currently available.

BRIEF DESCRIPTION

Disclosed herein is a method in which air and converted fuel are mixed in a fuel mixer to form an air-converted fuel mixture. The converted fuel is from an on-board fuel converter. The converted fuel includes a short chain hydrocarbon. A short chain hydrocarbon may include from 1 to about 8 carbon atoms per molecule. The air-converted fuel mixture is mixed with a high specific heat diluent to form an air-diluent-converted fuel mixture. The air-diluent-converted fuel mixture is mixed with a first amount of fuel to form a homogenous mixture.

Disclosed herein too is a system that includes a fuel tank for supplying a fuel; an on-board fuel converter and a reformed fuel mixer in fluid communication with the fuel tank; the fuel converter and the reformed fuel mixer being located downstream of the fuel tank; the fuel converter being operative for decomposing the fuel into a short chain hydrocarbon. The reformed fuel mixer mixes air with the short chain hydrocarbon to form an air-converted fuel mixture. An engine cylinder is in fluid communication with the fuel tank and the reformed fuel mixture. The engine cylinder is located downstream of the fuel tank and the reformed fuel mixer. The engine cylinder homogeneously mixes the air-converted fuel mixture and a first amount of fuel from the fuel tank during a compression stroke prior to combustion.

DETAILED DESCRIPTION

This disclosure includes embodiments that relate to a method of combustion. This disclosure includes embodiments that relate to a system and article that uses the method. Particularly provided is a method of homogenizing fuel composition contents in an internal combustion engine so as to reduce or eliminate particulate matter and nitrogen oxide emissions from the engine.

Disclosed herein are fuel-compositions for injection into the engine cylinder (hereinafter cylinder) of an internal combustion engine. The fuel-compositions may produce uniform combustion in the cylinder. The uniform combustion may reduce the amounts of particulate matter and nitrogen oxide emissions when compared with other methods that do not use the aforementioned fuel-compositions.

Figure 1:
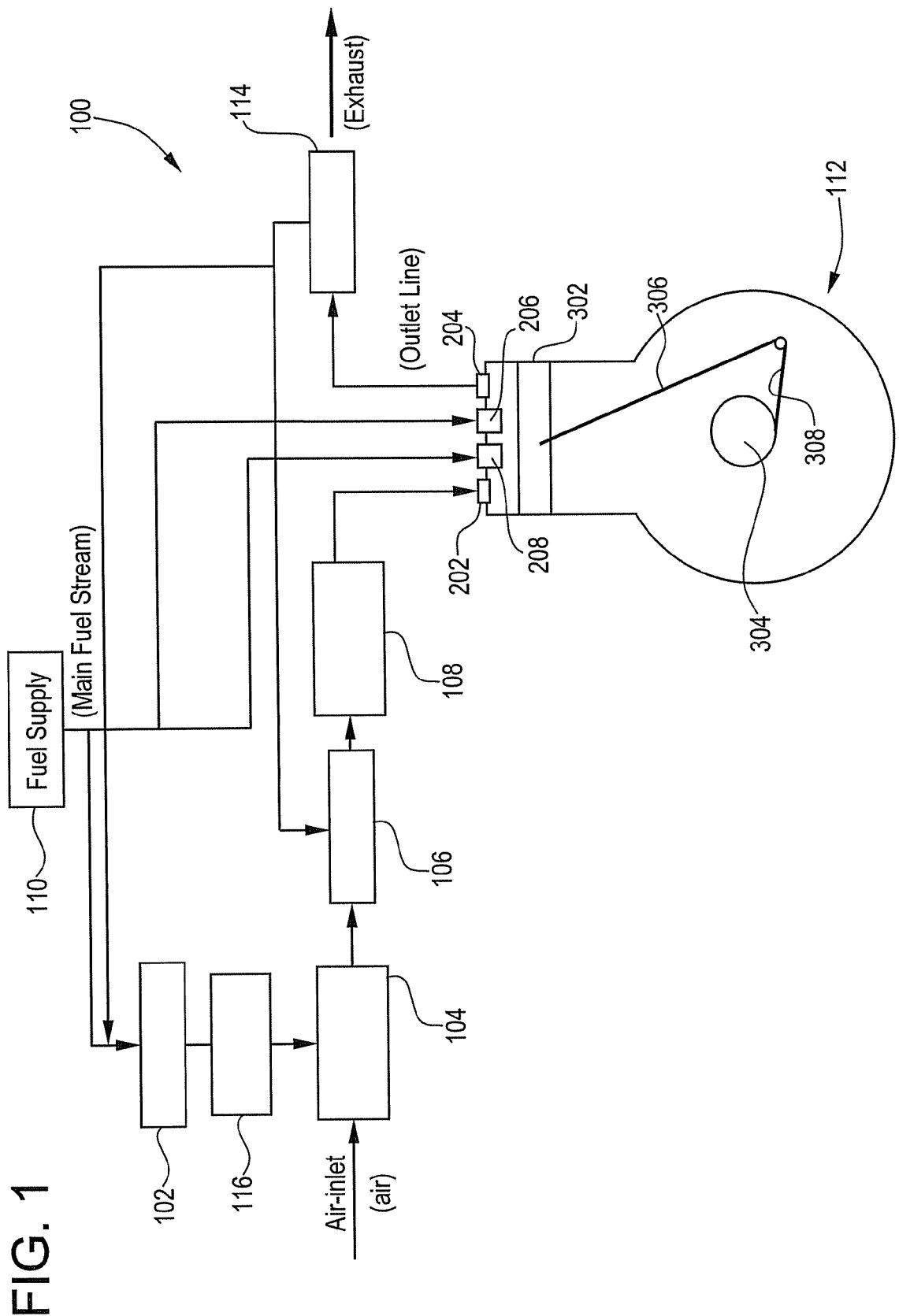
FIG. 1 is an exemplary depiction of a system for homogenizing the air, fuel, diluents and low molecular weight hydrocarbons that are combusted in the engine cylinder.

With reference to the FIG. 1, the device 100 includes a fuel converter 102, a fuel mixer 104, an exhaust gas recirculation mixer 106 (also called an exhaust gas recirculator or EGR mixer), an intake manifold 108, a fuel supply tank 110, an engine cylinder 112, and an exhaust manifold 114. In one embodiment, the device 100 may include a water gas shift reactor 116 to convert carbon monoxide and steam to hydrogen and carbon dioxide. The hydrogen and carbon dioxide may be added into the fuel mixer. The engine cylinder can be an internal combustion engine. In other embodiments, devices may be deployed such as pumps, filters, turbochargers, and high-pressure common rail fuel injection systems (not shown).

The fuel supply tank is upstream of the fuel converter, the fuel mixer, the EGR mixer, the intake manifold, the engine cylinder, and the exhaust manifold. The fuel supply tank, the fuel converter, the fuel mixer, the EGR mixer, the intake manifold, the engine cylinder, and the exhaust manifold are all in fluid communication with one another. In accordance with FIG. 1, the fuel converter, the fuel mixer, the exhaust gas recirculation mixer, and the intake manifold are located upstream of the engine cylinder. While the EGR mixer may be downstream of the fuel mixer, their relative locations can be reversed so that the fuel mixer is downstream of the EGR mixer. The fuel converter is located upstream of the fuel mixer and in fluid communication with it.

The exhaust manifold, the EGR mixer, the intake manifold and the engine cylinder are in fluid communication with one another and form a recycle loop. A portion of the exhaust from the engine cylinder may be recycled from the exhaust manifold to the EGR mixer. The exhaust can act as a diluent. In one embodiment, an optional water gas shift reactor may be located downstream of the fuel converter and upstream of the fuel mixer and supplies a stream of hydrogen rich syngas to the fuel mixer.

A controller (not shown) can respond to operation of the system by implementing process steps, or causing them to be implemented. The controller, and the components for implementation, may be mechanical, hydraulic, magnetic, and/or electric. Valves and actuators are included in the controller, as needed, to achieve a stated effect. While not detailed here, sensors, logic controllers, and software systems may interface with, or be included within, the controller.

In one embodiment, a method may include splitting a fuel stream from the fuel tank to the engine cylinder into a plurality of streams. The fuel streams are labeled a first stream, a second stream, a third stream, a fourth stream, and so on, for convenience. Suitable fuels may include one or more of gasoline, diesel, kerosene, or the like. An exemplary fuel is diesel. The method may account for diesel quality and properties by adjusting one or more operating parameters of the engine.

The first stream is subjected to a fuel conversion process in the on-board fuel converter to form hydrogen, carbon monoxide and low molecular weight hydrocarbons, which are then mixed with air in the fuel mixer to form an "air-converted fuel" mixture. The fuel converter may operate at a temperature of greater than about 500 degrees Celsius. In one embodiment, the operation temperature may be in a range of from about 500 degrees Celsius to about 600 degrees Celsius, from about 600 degrees Celsius to about 700 degrees Celsius, from about 700 degrees Celsius to about 800 degrees Celsius, from about 800 degrees Celsius to about 900 degrees Celsius, from about 900 degrees Celsius to about 1000 degrees Celsius, from about 1000 degrees Celsius to about 1050 degrees Celsius, or greater than about 1050 degrees Celsius.

The fuel converter may operate at a wide pressure range, the pressure of which may be based on the engine system, the fuel, the performance, and other operating parameters. In one embodiment, the fuel converter operates at a temperature and a pressure effective to convert the fuel into syngas or a mixture of hydrogen, carbon monoxide and a converted fuel mixture that includes short chain hydrocarbons. Short chain hydrocarbons may include $C_1$-$C_8$ hydrocarbons, $C_1$-$C_4$ hydrocarbons, or even $C_1$-$C_3$ hydrocarbons. Hydrocarbon chain length, and distribution of molecular weight may affect perform of the article. In one embodiment, the converted hydrocarbons consist essentially of $C_1$-$C_4$ hydrocarbons. In one embodiment, the converted hydrocarbons consist essentially of $C_1$-$C_3$ hydrocarbons. In some embodiments, longer chain hydrocarbons may be present in small quantities. Such small quantities may include up to about 30 weight percent (wt %) if desired. The hydrogen rich syngas and/or the gaseous $C_1$-$C_8$ hydrocarbons can mix with air in the fuel mixer to form the air-converted fuel mixture.

The air-converted fuel mixture discharges from the reformed fuel mixer to the EGR mixer where it is mixed with diluents. The diluents may be derived from the exhaust manifold to form an "air-diluent-converted fuel" mixture. The air-diluent-converted fuel mixture may discharge into the engine cylinder via the intake manifold and the inlet valve.

The diluents may be derived from the exhaust manifold and recycled to the EGR mixer. The diluents may be high specific heat diluents. Suitable diluents may include one or more of carbon dioxide, carbon monoxide, nitrogen and water. Other substances that are part of the exhaust stream can be removed from the diluent, if desired. For example, the system can have other devices such as, for example, a particulate filter, nitrogen catalytic reduction equipment (not shown), and the like, disposed between the exhaust manifold and the EGR mixer to remove particulate matter and nitrogen oxides. If desired, a turbocharger (for increased power generation) (not shown) may be disposed between the exhaust manifold and the EGR mixer. An optional gas cooler can be disposed downstream of the exhaust manifold and upstream of the exhaust gas mixer. The gas cooler may cool the EGR to affect overall performance.

As noted above, the production of nitrogen oxides may increase at localized combustion temperatures of greater than or equal to about 2,000 degrees Celsius. The presence of the exhaust gas in the fuel-air mixture may reduce combustion temperatures, reduce the combustion rate, increase homogeneity of the mixture, increase the volume or area of the flame front, act as a localized heat sink, and/or preheat the fuel-air mixture for more controlled combustion. In one embodiment, the diluent is added to the engine cylinder during combustion to reduce the overall temperature in the cylinder. In one embodiment, the diluent is added to the engine cylinder to reduce the average temperature of a localized flame front. The average temperature reduction may be by increasing the area or volume of the flame front, slowing the reaction rate by dilution of fuel-oxidant, or adding more bulk to act as a heat sink or temperature buffer. This may reduce the amount of nitrogen oxides produced.

The air-diluent-converted fuel mixture may be in a gaseous state at the temperature of operation of the cylinder. In one embodiment, the air-diluent-converted fuel mixture may be completely in the gaseous state at the temperature of operation of the cylinder. Having the air-diluent-converted fuel mixture in the gaseous state at the temperature of operation of the cylinder may rapidly mix the air-diluent-converted fuel mixture with the fuel in the second stream and possibly the third stream when these respective streams are brought together in the engine cylinder for purposes of combustion.

In the air-diluent-converted fuel mixture, the diluent may be present in an amount greater than about 5 weight percent (wt %). In one embodiment, the diluent may be present in an amount of about 5 wt % to about 10 wt %, about 10 wt % to about 15 wt %, about 15 wt % to about 20 wt %, about 20 wt % to about 25 wt %, about 25 wt % to about 30 wt %, about 30 wt % to about 50 wt %, or greater than or equal to about 50 wt %, based on the total weight of the air-diluent mixture.

Figure 2:
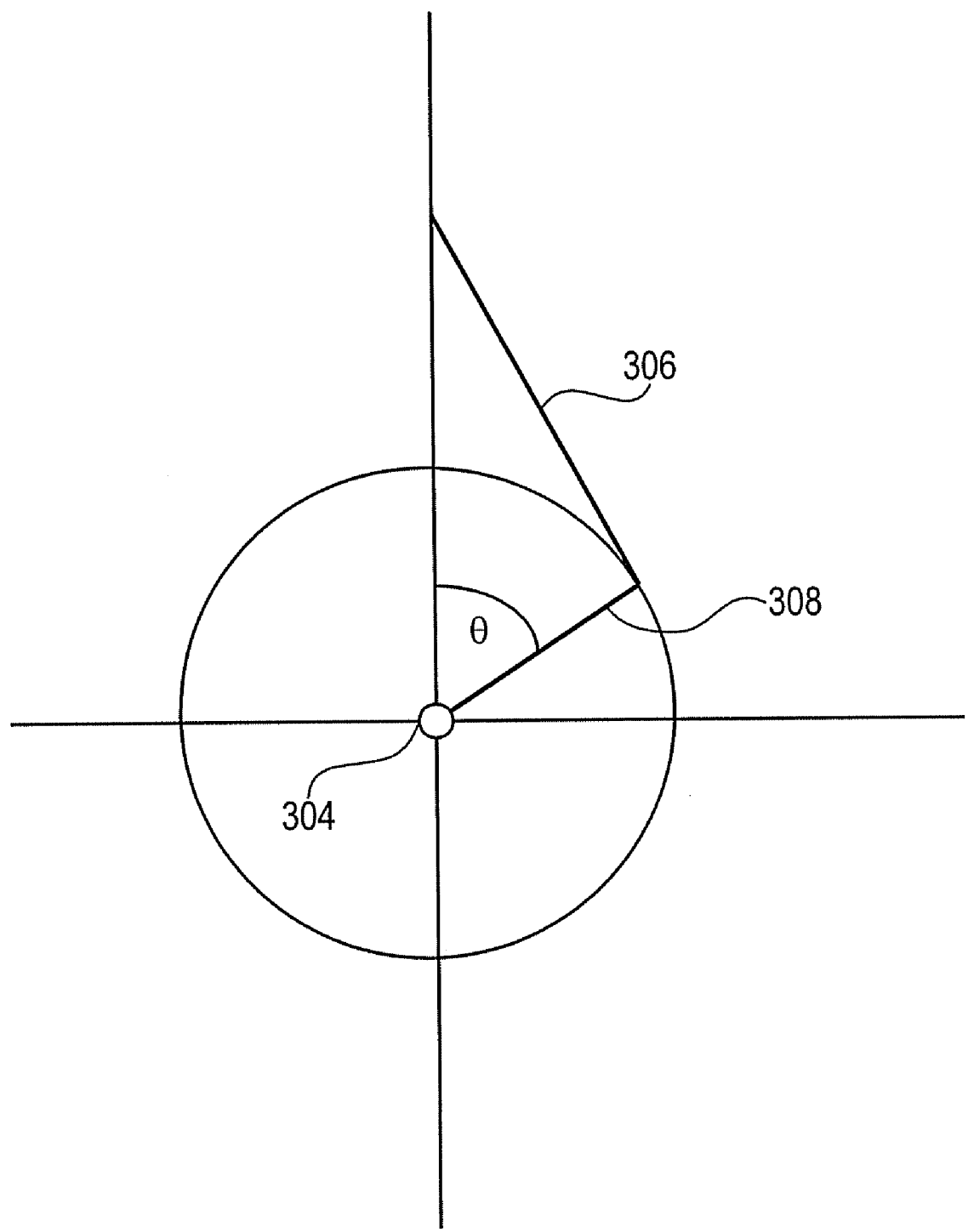
FIG. 2 is an exemplary schematic diagram of the crank and the piston that shows how the crank angle θ is measured.

With reference to FIG. 2, the air-diluent-converted fuel mixture is drawn into the engine cylinder from the intake manifold through the intake valve 202, when the piston 302 is moving down from the top dead center. As the piston 302 moves down from the top dead center to the bottom dead center (i.e., during the first expansion stroke), it draws in all of the air-diluent-converted fuel mixture from the intake manifold via the intake valve. During the first expansion stroke of the piston, when the crank angle θ reaches about 120 degrees to about 220 degrees, the inlet valve closes and the fuel injection of the second stream and the third stream begins.

FIGS. 1 and 2 depict an engine cylinder wherein the crank 308 is in rotatable communication with the crankshaft 304. And, the crank is in operative communication with the piston rod 306. The piston rod is in operative communication with the piston. The angle θ is the angle between the crank and a line XX that passes through the center of the piston as shown in the FIG. 2.

The second and third streams from the fuel tank discharged into the engine cylinder via first and second fuel injectors (206 and 208, respectively). The second and third streams may supply only fuel to the engine cylinder. The second stream and the third stream however, supply the fuel to the engine cylinder at different times during the stroke of the piston in the engine cylinder. This can mix the "air-diluent-converted fuel mixture" and the "fuel" in the second and third streams. This may generate smaller amounts of particulate matter and nitrogen oxides during the combustion process.

As the piston begins the first compression stroke, moving from the bottom dead center to the top dead center, the inlet valve 202 and outlet valve 204 close and the air-diluent-converted fuel mixture present in the engine cylinder is compressed. As noted above, if a water gas shift reactor is employed, then hydrogen may be added to the air-diluent-converted fuel mixture.

During the first compression stroke, as the air-diluent-converted fuel mixture is being compressed, the first fuel injector opens and a first amount of fuel from the second stream is injected into the engine cylinder in an atomized form. The first amount of fuel may be injected into the engine cylinder through a crank angle θ of about 100 degrees to about 30 degrees, as shown in the FIG. 2. Injecting the first amount of fuel from the second stream early in the first compression stroke may permit time for additional mixing between the fuel and the air-diluent-converted fuel mixture. The additional time provided for the mixing between the first amount of fuel from the second stream and the air-diluent-converted fuel mixture of the first stream facilitates the formation of a homogenous blend of fuel, air, diluent, and low molecular weight hydrocarbons. The formation of the homogenous blend facilitates additional blending with a second amount of fuel from the third stream that is introduced into the engine cylinder during the end of the first compression stroke.

The first amount of fuel from the second stream that is injected into the engine cylinder in an amount that may be greater than about 5 wt % of the total fuel introduced in the engine cylinder. In one embodiment, the first amount of fuel from the second stream that is injected into the engine cylinder may be in an amount of about 5 wt % to about 10 wt %, about 10 wt % to about 15 wt %, about 15 wt % to about 20 wt %, about 20 wt % to about 25 wt %, about 25 wt % to about 30 wt %, about 30 wt % to about 40 wt %, or greater than or equal to about 40 wt % of the total fuel introduced in the engine cylinder.

As the piston reaches the top dead center, towards the end of the first compression stroke, the second fuel injector injects the main supply of fuel (hereinafter the second amount of fuel) from the third stream into the engine cylinder. It is generally desirable for the injection of the second amount of fuel to begin within 5 degrees crank angle on either sides of the compression end top dead center. Toward the end of the first compression stroke when the mixture temperature and pressure conditions are favorable for ignition, the final mixture of fuel, diluents, air, and low molecular weight hydrocarbons undergoes autoignition. The combustion following autoignition causes an expansion of the final mixture in the engine cylinder and pushes the piston downwards towards the bottom dead center for the second expansion stroke. The piston then returns to the top dead center for the second compression stroke, thus completing the four strokes of the cycle.

It is to be noted that while FIG. 1 depicts two fuel injectors, a single fuel injector may be used in another embodiment to inject the first amount of fuel and the second amount of fuel. Alternatively, more than two fuel injectors may be used, as needed.

The second amount of fuel may be present in the engine cylinder in an amount that is greater than about 40 wt % based on the total weight of fuel introduced in the engine cylinder. In one embodiment, the second amount of fuel is present in the engine cylinder in an amount of about 40 wt % to about 45 wt %, about 45 wt % to about 50 wt %, 50 wt % to about 55 wt %, about 55 wt % to about 60 wt %, about 60 wt % to about 70 wt %, about 70 wt % to about 80 wt %, about 80 wt % to about 90 wt %, or greater than or equal to about 90 wt % based on the total weight of fuel introduced in the engine cylinder.

During the second compression stroke, the exhaust valve opens and the exhaust is discharged from the engine cylinder through the exhaust valve to the exhaust manifold. As noted above, a portion of the exhaust stream is directed from the exhaust manifold to the EGR mixer to act as a diluent. After the fourth stroke is completed, the entire process as described herein is repeated.

The exhaust discharged from the engine cylinder may contain a lower amount of particulate matter when compared with an engine that does not employ the aforementioned composition or does not employ the premixing in the cylinder that permits homogenization of the fuel, low molecular weight hydrocarbons, air and diluents.

The device as described herein may be configured for use in a locomotive, an automobile, ship, or planes. In another aspect, the device may be configured for use with a stationary engine.

It will be understood that, although the terms first, second, third, and the like may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, first element, component, region, layer or section discussed below could be termed second element, component, region, layer or section without departing from the teachings of the present invention.

As used herein, the singular forms "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Furthermore, in describing the arrangement of components in embodiments of the present disclosure, the terms "upstream" and "downstream" are used. These terms have their ordinary meaning. For example, an "upstream" device as used herein refers to a device producing a fluid output stream that is fed to a "downstream" device. Moreover, the "downstream" device is the device receiving the output from the "upstream" device. However, it will be apparent to those skilled in the art that a device may be both "upstream" and "downstream" of the same device in certain configurations, e.g., a system including a recycle loop.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

The invention claimed is:

1. A method, comprising:
   mixing air and converted fuel from an on-board fuel converter in a fuel mixer to form an air-converted fuel mixture, the converted fuel comprising a short chain hydrocarbon;
   mixing the air-converted fuel mixture with a high specific heat diluent obtained from an engine exhaust to form an air-diluent-converted fuel mixture;
   mixing the air-diluent-converted fuel mixture with a first amount of fuel to form an about homogenous mixture in an engine cylinder; and
   combusting the homogenous mixture with a second amount of fuel in the engine cylinder.

2. The method of claim 1, further comprising forming hydrogen from a water gas shift reactor, and adding the hydrogen to the air-converted fuel mixture.

3. The method of claim 1, further comprising deriving the high specific heat diluent from an exhaust stream.

4. The method of claim 1, further comprising controlling the air-diluent-converted fuel mixture to be present in the engine cylinder during use to be in an amount in a range of from about 1 weight percent to about 45 weight percent based on the total weight of the converted fuel, the first amount of fuel, and the second amount of fuel introduced into the engine cylinder.

5. The method of claim 1, further comprising controlling the first amount of fuel to be present in the engine cylinder during use to be in an amount in a range of from about 5 weight percent to about 35 weight percent based on the total weight of the converted fuel, the first amount of fuel, and the second amount of fuel introduced into the engine cylinder.

6. The method of claim 1, further comprising controlling the second amount of fuel to be present in the engine cylinder in an amount in a range of from about 40 weight percent to about 90 weight percent based on the total weight of the converted fuel, the first amount of fuel, and the second amount of fuel introduced into the engine cylinder.

7. The method of claim 1, further comprising selecting a fuel for use as the first amount of fuel from diesel, gasoline, or kerosene.

8. The method of claim 7, further comprising selecting a fuel for use as the second amount of fuel to be different from the first amount of fuel.

9. The method of claim 1, further comprising selecting a fuel for use as the second amount of fuel from diesel, gasoline, or kerosene.

10. The method of claim 1, wherein the mixing of the air-diluent-converted fuel mixture with the first amount of fuel comprises timing the mixing in the engine cylinder when a crank angle is in a range of from about 100 degrees to about 30 degrees before compression top dead center.

11. The method of claim 1, further comprising deriving the converted fuel from a fuel that is compositionally similar to, or the same as, a fuel used in the first amount of fuel or the fuel used in the second amount of fuel.

12. The method of claim 1, further comprising decomposing the fuel in the fuel converter to derive the short chain hydrocarbon having less than about 8 carbon atoms per molecule.

13. The method of claim 1, wherein said mixing of the air-diluent-converted fuel mixture with the first amount of fuel to form a homogenous mixture occurs in the engine cylinder.

14. The method of claim 1, further comprising supplying the second amount of fuel to the engine cylinder only after a supply flow of the first amount of fuel to the engine cylinder is terminated.

* * * * *